(12) United States Patent
Serdiuk

(10) Patent No.: US 10,144,837 B2
(45) Date of Patent: Dec. 4, 2018

(54) METHOD FOR DELIVERING ALUMINUM INTO WATERBORNE TINT BASE OR PAINT AND REFINISH MIXER SYSTEM

(71) Applicant: BASF Coatings GmbH, Muenster (DE)

(72) Inventor: Paul Serdiuk, Warren, MI (US)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 14/270,847

(22) Filed: May 6, 2014

(65) Prior Publication Data
US 2015/0322284 A1 Nov. 12, 2015

(51) Int. Cl.
| | |
|---|---|
| C09D 139/06 | (2006.01) |
| C09D 129/04 | (2006.01) |
| C08K 3/22 | (2006.01) |
| C09D 7/12 | (2006.01) |
| C09D 7/61 | (2018.01) |
| C09D 7/80 | (2018.01) |
| C08K 3/08 | (2006.01) |

(52) U.S. Cl.
CPC .............. *C09D 7/1216* (2013.01); *C08K 3/22* (2013.01); *C09D 7/61* (2018.01); *C09D 7/80* (2018.01); *C09D 129/04* (2013.01); *C09D 139/06* (2013.01); *C08K 3/08* (2013.01); *C08K 2003/0812* (2013.01); *C08K 2003/2227* (2013.01)

(58) Field of Classification Search
USPC ....... 525/176, 444.5; 106/290, 308; 524/441
See application file for complete search history.

(56) References Cited

U.S. PATENT DOCUMENTS

| | | | |
|---|---|---|---|
| 3,954,496 A * | 5/1976 | Batzar | 106/404 |
| 4,725,317 A * | 2/1988 | Wheeler | 106/403 |
| 7,005,168 B2 | 2/2006 | Verrall et al. | |
| 7,329,441 B2 | 2/2008 | Catlin et al. | |
| 8,268,914 B2 | 9/2012 | Verrall et al. | |
| 8,877,240 B1 * | 11/2014 | Moore | C11D 17/0073 424/464 |
| 2003/0060387 A1 | 3/2003 | Hsu et al. | |
| 2003/0176536 A1 * | 9/2003 | Rathschlag et al. | 523/171 |
| 2004/0137246 A1 | 7/2004 | Fristad et al. | |
| 2004/0182049 A1 | 9/2004 | Duffield | |
| 2006/0047062 A1 | 3/2006 | Hsu et al. | |
| 2007/0231441 A1 | 10/2007 | Verrall et al. | |
| 2007/0266901 A1 * | 11/2007 | Rance | C08L 3/02 106/501.1 |
| 2012/0034851 A1 | 2/2012 | Song | |
| 2013/0273277 A1 | 10/2013 | Lee et al. | |

FOREIGN PATENT DOCUMENTS

DE 102007047586 A1 4/2009

OTHER PUBLICATIONS

PCT International Search Report and Written Opinion in PCT/EP2015/056505 dated Jun. 22, 2015, 11 pages.
PCT International Preliminary Report on Patentability in PCT/EP2015/056505 dated Nov. 8, 2016, 8 pages.

\* cited by examiner

*Primary Examiner* — Deve E Valdez
(74) *Attorney, Agent, or Firm* — Oblon, McClelland, Maier & Neustadt, L.L.P.

(57) ABSTRACT

An automotive refinish coating mixer system includes
(a) one or both of
  (i) at least one pellet of a compressed mixture of metal pigment and a powdered, water-soluble polymer and
  (ii) at least one pre-measured portion of metal flake pigment sealed in water-soluble polymer film;
(b) a plurality of aqueous pigmented and unpigmented bases; and
(c) a reducer base.

6 Claims, No Drawings

US 10,144,837 B2

METHOD FOR DELIVERING ALUMINUM INTO WATERBORNE TINT BASE OR PAINT AND REFINISH MIXER SYSTEM

FIELD OF THE INVENTION

The present invention concerns compositions for waterborne metallic-flake paints, metallic flake preparations for making these, mixer systems for preparing aqueous automotive coatings, processes of making the paints. In particular, the invention concerns refinish paints and processes, which are room temperature or low cure temperature coatings.

BACKGROUND

This section provides information helpful in understanding the invention but that is not necessarily prior art.

Aqueous (waterborne) coating compositions have been adopted for producing original finish (OEM) automotive basecoat compositions for many reasons, including lower volatile organic content and better appearance for metallic and pearlescent colors, which are produced using flake pigments. Metal flake pigments, especially aluminum flake pigments, are commonly used in making metallic basecoat coating compositions, but the long-term instability of aluminum flake pigments and other metal flake pigments in aqueous coating compositions has been a persistent problem. The metal pigment's appearance is degraded by attack of water over time, which produces a hydrated oxide layer on the flake that discolors the flake and diminishes its metallic effect. Accumulation over time of the hydrogen evolved from the oxidation reaction is a further problem. Aluminum flake pigments have been given various treatments to slow the attack of water on the flakes, including treatments with organic phosphate esters, silica encapsulation, treatment with carboxylic chromic chloride, and treatment with transition metal salts.

Automotive refinish coatings must match the original finish as closely as possible, and for that reason, as well as for reducing regulating emission, the refinish sector uses aqueous paints for basecoats and other colored topcoats. Automotive refinish coatings are prepared using a refinish mixer system having component bases designed to used together to produce a wide range of paint colors. The mixer system components include pigmented bases that have one or more pigments dispersed in a refinish binder, unpigmented bases having a binder or binder component, and reducer base for adjusting the viscosity of the paint being prepared. An automotive metallic basecoat paint is typically prepared using at least three components: an aluminum base, at least one pigmented or unpigmented base, and a reducer base. Aqueous, metallic refinish paints have been prepared using an aluminum base with treated aluminum flake pigment such as is used in making OEM waterborne basecoats. However, refinish bases may need to have a much longer shelf-life than its OEM counterpart. The aluminum bases may be formulated in a solvent environment by mixing aluminum pigment, a water-dispersible acrylic resin, and sufficient water-miscible solvent in making the aluminum base component. An aluminum base of this mixture is introduced into a waterborne paint just prior to use, for example as described in EP0471972 (BASF Corporation). The aluminum base containing the aluminum pigment and resin mixture must be formulated with a viscosity that allows it to be worked with easily by the refinish paint shop, and it may generally contain a substantial amount solvent, perhaps 50-70 weight percent solvent.

It would be desirable to formulate a metallic pigment base in a way in which it is still easy to handle and measure, keeps the metal flake pigment from being degraded by water during storage, but introduces less organic solvent into the refinish paint along with the metal pigment.

SUMMARY OF THE DISCLOSURE

Disclosed are discrete portions of metal pigments and solid (i.e., not dispersed or dissolved), water-soluble polymers. The discrete portions may be configured for making refinish paints. "Configured for making refinish paints" means that the discrete portions are sized for making a smallest standard size of refinish paint for a mixer system (e.g., for making a pint or a half-liter of refinish paint).

In a first embodiment, the discrete portions are compressed mixtures of metal pigment and powdered, water-soluble polymer. The compressed mixtures may be formed in disks, pills, chunks, chips, tablets, or another shape. For convenience, "pellet" and "pellets" are used in this description to refer collectively to the compressed mixtures regardless of actual shape. In preferred embodiments, the water-soluble polymer is a polyvinylpyrrolidone polymer. In preferred embodiments, the metal is an aluminum pigment or a surface layer-modified aluminum pigment. A surface layer-modified aluminum pigment has one or more surface layers that modify the color or effect of the pigment, such as optically variable pigments or colored aluminum pigments.

In a second embodiment, the discrete portions are pre-measured portions of metal pigment sealed in a water-soluble polymer film. In preferred embodiments, the film is a polyvinyl alcohol film and the metal is an aluminum pigment or a surface layer-modified aluminum pigment.

Further disclosed are automotive refinish coating mixer systems including (a) one or both of
  (i) pellets of a compressed mixture of metal pigment and a powdered, water-soluble polymer and (ii) pre-measured portions of metal pigment sealed in a film of a water-soluble polymer;
(b) a plurality of aqueous pigmented and unpigmented bases; and (c) a reducer base.

Also disclosed is a method of making an aqueous automotive refinish metallic paint by combining (i) at least one pellet of a compressed mixture of metal pigment and a powdered, water-soluble polymer, (ii) a pre-measured portion of metal pigment sealed in a film of a water-soluble polymer, or both (i) and (ii) with at least one pigmented or unpigmented aqueous base. The method may further include adding reducer base to adjust the viscosity of the paint for application.

The pellets of a compressed mixture of metal flake pigment and a powdered, water-soluble polymer and the pre-measured portions of metal flake pigment sealed in a film of a water-soluble polymer protect the metal flake pigment from water during storage of the metal flake pigment in the mixer system, but allow the metal flake pigment to be easily handled and measured when preparing aqueous, metallic, refinish paints with the mixer system. The mixer system for making aqueous automotive refinish metallic paints including these pellets or pre-measured portions has a longer shelf-life for these as compared to metal flake pigment-containing mixer system components containing water.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments. The terms "comprises," "comprising," "including," and "having," are inclusive and therefore specify the presence of stated items, but do not preclude the presence of other items. As used in this specification, using the term "or" includes any and all combinations of one or more of the listed items. A "volatile content" is determined by the ASTM D2369 test ("Standard Test Method for Volatile Content of Coatings"). "Aqueous" or "waterborne" coating compositions are those with a volatile content that includes at least 20% by weight water based on total volatile content weight as determined by ASTM D3792 ("Standard Test Method for Water Content of Coatings by Direct Injection Into a Gas Chromatograph"). A "water-soluble" polymer is a polymer that in the aqueous phase forms aggregates having an average particle diameter of <50 nm, preferably <35 nm, and more preferably <20 nanometers, or else are in molecularly disperse solution.

DETAILED DESCRIPTION

A detailed description of exemplary, nonlimiting embodiments follows.

The discrete portions of metal pigment and solid, water-soluble polymer may be made using any kind of metal flake pigment. Commonly used metallic pigments are copper, copper alloys, aluminum, surface modified-aluminum, gold-bronze, iron flakes, stainless steel flakes, zinc pigments, and coated metallic foils. These may be used in combination, but preferably are individually used in making the discrete portions of metal flake pigment. Discrete portions of different metal flake pigment may then be used together in making aqueous refinish paints. Typical metallic pigments are aluminum pigments, including non-leafing flakes which are prepared as pastes by a milling process combining aluminum with a lubricant which is typically oleic acid and a pasting agent such as mineral oil and aromatic and aliphatic naphthas. During subsequent treatment of the material, organic liquid can be added or changed, and inhibiting agents and/or emulsifiers can be added. A typical aluminum pigment composition is 55-75% aluminum flake, 22-44% organic liquid such as the pasting agent, 1-3% oleic acid or other lubricant, and 0-5% inhibiting agents and/or emulsifiers. The aluminum flakes may have a size distribution that typically averages between 8 and 32 micrometers, but in general useful aluminum pigments may have a range of about 3 to 50 micrometers. The shape and size distribution of flakes among commercially available aluminum pastes provides differences in brilliance, sparkle, two-tone appearance, smoothness, lightness, and difference between lightness in the face and darkness as seen at an oblique angle. These differences may be very important and are often exploited in the color design of metallic coatings for automotive vehicles. Flake size can be measured by the laser light scattering method. Instruments that can be used to measure flake size by laser light scattering are commercially available from Malvern (e.g., Model Mastersizer 3000E) and Horiba Scientific (Model LA-950).

Colored aluminums are aluminum flake is coated with a thin iron oxide layer (iron oxide-aluminum pigments) or other organic pigments. As a result of interference at this layer, the metallic effect is accompanied by a color effect. Examples include titanium dioxide-coated, iron oxide-coated or mixed oxide-coated aluminums, green or blue phthalocyanine-coated aluminums, diketopyrrolopyrrole-coated aluminum, quinacridone-coated aluminum, carbazole violet-coated aluminum, and so on.

The recent approaches to optically variable pigments have generally adopted one of two techniques, both of which are designed to position a low refractive index layer such as silica (refractive index 1.5) between semi-reflective layers. In the first approach, a stack of layers is provided on a temporary substrate, which is often a flexible web. The layers are generally made up of aluminum, chromium, magnesium fluoride, and silicon dioxide. The stack of layers is separated from the substrate and subdivided into appropriately-dimensioned flakes. The pigments are produced by physical techniques such as physical vapor deposition onto the substrate, separation from the substrate, and subsequent comminution or by other deposition techniques (plasma, sputtering etc.) and subsequent deflaking of the decomposition product. Pigments obtained in this way have a central layer and all other layers in the stack are not completely enclosed by the other layers. The layered structure is visible at the faces formed by the process of comminution. In the other approach, a platelet-shaped, opaque metallic substrate is coated or encapsulated with successive layers of selectively absorbing metal oxides and non-selectively absorbing layers of carbon, metal sulfide, metal, or metal oxide. The layers are applied by multiple techniques such as chemical vapor deposition and sol-gel processes.

By far the metal flake pigment most commonly used in automotive paints is aluminum pigment. Many commercial grade aluminum pigments are available and may be used.

The aluminum or other metal pigments should be treated to resist degradation by water once dispersed in the aqueous refinish paint. Many such treatments are know, such as the treatments with organic phosphate esters, silica encapsulation, treatment with carboxylic chromic chloride, and treatment with transition metal salts mentioned above. A stabilizer, such as 0.1 to 3.0 percent, preferably 0.2 to 1.0 percent of an organically-modified phosphoric-acid ester, may be included to extend the useful pot life of aqueous refinish paints prepared from the aluminum pellets. In another method, the metal pigment flakes may be encapsulated in a water-insoluble polymer.

Pellets

In a first embodiment, the metal flake pigment, which in various preferred embodiments is an aluminum flake pigment or coated aluminum flake pigment (e.g., a colored aluminum or optically variable pigment containing aluminum flake), is mixed with a powdered, water-soluble polymer, which in various preferred embodiments is or includes polyvinylpyrrolidone powder, and is then compressed into pellets that can be easily stored and used in making automotive refinish paint. The metal flake pigment should already be treated as just described to resist degradation by water once dispersed in the aqueous refinish paint.

Suitable powdered water-soluble polymers include water-soluble polymers that are used as pharmaceutical excipients (binders) in preparing medicine tablets and pills such as hydroxypropylcellulose, hydroxyethylcellulose, sodium carboxymethyl cellulose, hydroxypropyl methylcellulose, polyvinylpyrrolidone, pectin, carrageenan and guar gum. One preferred powdered, water-soluble polymer is polyvinylpyrrolidone. In preferred embodiments, the polyvinylpyrrolidone polymers have a weight average molecular weight of at least about 10,000, preferably at least about 20,000, and up to about 60,000, preferably up to about 50,000. In certain preferred embodiments the weight average molecular weight of the polyvinylpyrrolidone used may be from about 25,000 to about 45,000, more preferably from about 25,000 to about 40,000. If the polyvinylpyrrolidone molecular weight is too high, it tends to unduly increase the viscosity of the paint composition made using the metal flake pellets. If the polyvinylpyrrolidone molecular weight is too low, it may not compound properly with the aluminum pigment, may not form a durable pellet, or may cause incompatibility problems in the paint composition.

Powders with mean particle sizes in the range from 10 to 400 µm may be used. For best compacting properties, low dusting, and quick dissolution when mixed into the aqueous bases, the fine fraction below 50 µm and the coarse fraction above 500 µm in the polyvinylpyrrolidone powder should be kept as small as possible.

Polyvinylpyrrolidones are typically prepared by free-radical polymerization in solution. To prepare polymers with relatively low molar masses, isopropanol may be used as the solvent, while relatively high molecular weight polymers are usually polymerized in water. Powders may be obtained by spray-drying the resulting polymers. U.S. Pat. No. 3,644,305 discloses a spray polymerization process with which low molecular weight polymers can be prepared. The polymerization is carried out at elevated pressure. Spray polymerization processes are also known from WO 2006/079631, WO 2006/114404, WO 2006/120232, and US Patent Application 2009/0131549. For example, the vinylpyrrolidone monomer may be polymerized in aqueous solution in the presence of free radical initiator, for example from 0.001 to 5% by weight of a water-soluble initiator selected from peroxides, hydroperoxides, hydrogen peroxide, persulfates, azo compounds and the so-called redox initiators or by irradiating a photoinitiator. Spray polymerization allowed the process steps of polymerization and drying to be combined with some control of particle size.

Suitable polyvinylpyrrolidone powders are commercially available, for example from BASF SE under the trademark LUVITEC® K as powders in a range of molecular weights and average particle sizes. Pharmaceutical-grade polyvinylpyrrolidone powders are also available from BASF SE under the trademark KOLLIDON®. Suitable products include KOLLIDON®25 and KOLLIDON®30, polyvinylpyrrolidone homopolymers with published weight average molecular weight values of 28,000-34,000 and 44,000 to 54,000, respectively.

The mixture of metal flake pigment, e.g. aluminum flake pigment, and the powdered water-soluble polymer, e.g., polyvinylpyrrolidone powder, may contain at least about 1 wt %, preferably from about 5 wt %, and up to about 20 wt %, preferably up to about 15 wt % powdered water-soluble polymer (e.g., polyvinylpyrrolidone powder), based on the combined weights of the metal flake pigment (solid weight of metal pigment, ignoring any organic liquid content) and the weight of powdered water-soluble polymer. In various preferred embodiments, a mixture of aluminum flake pigment and polyvinylpyrrolidone contains from about 5 wt % to about 15 weight percent, preferably from about 7 wt % to about 13 wt %, and more preferably from about 8 wt % to about 12 wt % polyvinylpyrrolidone, based on the combined weights of the aluminum flake pigment (solid weight of aluminum pigment) and the weight of polyvinylpyrrolidone.

The mixture of metal flake pigment and water-soluble polymer powder is compressed into solid forms of regular or irregular shape, for example pills, disks of round or elliptical perimeter, tablets, flattened solids of square, rectangular, or irregular perimeter, ellipsoids, spheres, cubes, prisms, cones, chips, or other shapes that can be easily handled and measured out in making refinish paints, collectively referred to in this description as "pellets." The compression may be carried out in a tablet machine using a mold of a desired size and shape. Typical compaction pressures using such machines range from about 1000 lbs to about 10,000 lbs, and more preferably from about 4,000 lbs to about 8,000 lbs, where lbs is pounds force. Typical compaction temperatures range from about 15° C. to about 60° C. and more preferably from about 20° C. to about 40° C. The size may be selected to provide a desired unit weight of metal pigment when the pellets are used in making a metallic paint. In general, the pellets may be sizes from small granules to large tablets. For example, in various embodiments, the pellets may have a maximum length or axis of up to about 40 mm and may have a minimum width, thickness, or axis of at least about 1 mm. In various embodiments, it is preferred for the pellets to have a maximum length or axis up to about 10 mm and minimum width, thickness, or axis of at least about 2 mm.

The pellets may be further processed as desired. For example, the pellets may be coated with a water-soluble coating. A coating layer of polyvinylpyrrolidone or other water-soluble polymer such as any of those mentioned above may be applied to the pellets. The coating may be applied by the usual methods for coating pellets and may include typical additives such as minor amounts of water-soluble plasticizer such as glycerol. The polymer used for the coating layer should be selected to be easily dissolved in water at room temperatures with stirring.

Pre-Measured Metal Pigment in Film

In a second embodiment, the discrete portions are pre-measured portions of metal flake pigment sealed in a film of a water-soluble polymer. The metal flake pigment is the same as already described and in various embodiments is preferably an aluminum pigment. The film may be formed from one or more water-soluble polymers such as polyvinyl alcohol, cellulose ethers, polyethylene oxide, starch, polyvinylpyrrolidone, polyacrylamide, polyvinyl methyl ether-maleic anhydride, polymaleic anhydride, styrene maleic anhydride, hydroxyethylcellulose, methylcellulose, polyethylene glycols, carboxymethylcellulose, polyacrylic acid salts, alginates, acrylamide copolymers, guar gum, casein, ethylene-maleic anhydride resin series, polyethyleneimine, ethyl hydroxyethylcellulose, ethyl methylcellulose, hydroxyethyl methylcellulose. In various embodiments, films containing water-soluble polyvinyl alcohol are preferred.

The water-soluble polymer film should have properties, such as strength and pliability, to permit it to be used in the packaging process without tearing. Plasticizers such as glycerin can be added to improve flexibility of polyvinyl alcohol film. Polyethylene oxide can be used for better solubility at room temperatures (20-25° C.).

Generally, preferred water-soluble, polyvinyl alcohol polymers have relatively low weight average molecular weights and low levels of residual acetate groups. Preferred water-soluble polyvinyl alcohols have weight average molecular weights between 1,000 and 300,000, preferably between 2,000 and 100,000, most preferably between 2,000 and 75,000. Polyvinyl alcohol is generally prepared by hydrolysis or alcoholysis of polyvinyl acetate. The extent of hydrolysis or alcoholysis, i.e., the percent completion of the reaction where acetate groups on the resin are substituted with hydroxyl groups, affects cold water solubility. A hydrolysis range of from 60-99% of polyvinyl alcohol film-forming resin is preferred, while a more preferred range of hydrolysis is from about 70-90% for water-soluble, polyvinyl alcohol film-forming resins. The most preferred range of hydrolysis is 80-90%. Thus, "polyvinyl alcohol" includes polymers in which most, but not all, of the acetate groups of polyvinyl acetate have been replaced by alcohol groups. The retention of this low fraction of acetate groups results in quicker dissolution in cold water. These partially hydrolyzed polyvinyl alcohol polymers are commonly referred to as polyvinyl alcohol homopolymers, although technically they are vinyl alcohol-vinyl acetate copolymers.

The water-soluble film may have a thickness of from about 0.5 mils (12.5 µm) to about 7.0 mils (177.8 µm), preferably from about 2.0 mils (50.8 µm) to about 5.0 mils (127 µm), and more preferably from about 2.0 mils (50.8 µm) to about 3.0 mils (76.2 µm). The film should be thick enough so that it can be handled during manufacturing and use of the sealed, pre-measured portions of metal flake pigment packages, however using a film that is thicker than needed will slow dissolution and release of the metal flake pigment when making the aqueous refinish paints. The water-soluble films may include additives such as plasticizers and surfactants.

One example of commercially available, suitable water-soluble films are 3 mil (76.2 micrometers) and 1.5 mil (38.1 micrometers) thicknesses of M8534, sold by MonoSol.

The weight percent of water-soluble, film-forming resin in the final articles of the present invention is from about 10% to about 90%, preferably about 15% to about 75%, and most preferably about 20% to about 50%.

The pre-measured portions of metal flake pigment sealed in a water-soluble polymer film may be prepared by creating a pouch from two polyvinyl alcohol sheets, filling with a desired amount of aluminum, and sealing the pouch. The water-soluble polymer film may be sealed by, for example, heat using water or an adhesive The pre-measured portions of metal flake pigment can be made using commercially available vertical form fill seal (VFFS) and horizontal form fill seal (HFFS) machines.

Refinish Mixer System

The automotive refinish coating mixer systems include discrete portions of metal flake pigments and solid, water-soluble polymers configured for making refinish paints as one or both of the pellets of a compressed mixture of metal flake pigment and powdered, water-soluble polymer and the pre-measured portions of metal flake pigment sealed in water-soluble polymer film; a plurality of aqueous pigmented and unpigmented bases; and a reducer base. The components of the refinish mixer system are configured to be combined to prepare aqueous pigmented refinish coating compositions or paints with accurately defined colors for refinish automotive vehicles or parts. Each coating composition or paint made will have equivalent performance. Thus, the set of pigmented and unpigmented bases are carefully formulated to allow wide-ranging colors in refinish coatings that deliver equivalent performance properties. The automotive refinish coating mixer system may include multiple embodiments of the discrete portions of metal flake pigments including, for example, different kinds of metal flake pigments, different shapes and sizes of pellets, different shapes or sized of pre-measured portions of metal flake pigment sealed in water-soluble polymer film, or some combination of these different embodiments.

The aqueous pigmented and unpigmented bases each includes a film-forming binder dissolved or dispersed in an aqueous medium. Any such binders known to the person skilled in the art can be used. Nonlimiting examples of suitable water-soluble or -dispersible binders include polyurethanes, acrylated polyurethanes, polyacrylates (acrylic polymers), polyesters, acrylated polyesters, and alkyd resins. The binder systems can be physically dried and/or chemically crosslinked, for example by polymerization, polycondensation and/or polyaddition reactions. Chemically cross-linkable binder systems contain corresponding cross-linkable functional groups. Suitable functional groups are, for example, hydroxyl groups, isocyanate groups, acetoacetyl groups, unsaturated groups, for example, (meth) acryloyl groups, epoxide groups, carboxyl groups and amino groups. Crosslinking agents with appropriate, complementarily reactive functional groups may be provided for crosslinking. For example, hydroxyl group-containing polymers and polyisocyanate crosslinking agents may be used as chemically crosslinkable binder systems. The crosslinking agent may be kept in a separate base in the mixer system. The water-soluble or -dispersible binder resins have ionic and/or non-ionic groups, for example carboxyl groups, amine groups, and polyethylene oxide segments. Suitable neutralizing agents for the preferred carboxyl groups are basic compounds, such as, tertiary amines, for example, triethylamine, dimethylethanolamine, diethylethanolamine. In addition to or in place of the above-mentioned possibilities, external emulsifiers can also be used to disperse the binder.

The aqueous medium includes water and may include one or more organic liquids soluble or miscible in water that may act as cosolvents in the dispersion and coalescing or flow agent during film formation after the paint is applied to a substrate. Nonlimiting examples of suitable organic liquids soluble or miscible in water include methyl ethyl ketone, acetone, ethanol, methanol, propanol, butanol, N-methylpyrolidone, naphthas, 2,2,4-trimethyl-1,3-pentanediol monoisobutyrate, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene glycol methyl ether, propylene glycol methyl ether acetate, propylene glycol ethyl ether, propylene glycol ethyl ether acetate, propylene glycol propyl ether, propylene glycol butyl ether, propylene glycol t-butyl ether, propylene glycol hexyl ether, dipropylene glycol methyl ether, dipropylene glycol ethyl ether, dipropylene glycol propyl ether, methyl ethyl ketone and dipropylene glycol butyl ether and so on.

The pigmented bases also contain one or more pigments. Generally, the pigmented bases contain one, two, three, four, or five pigments. Nonlimiting examples of suitable pigments and fillers that may be utilized in the pigmented bases include inorganic pigments such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), and ultramarine, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, nanoparticles based on silicon dioxide, aluminum oxide or zirconium oxide, and so on. The pigment or pigments are preferably dispersed by milling with a water-thinnable or water-dispersible resin or polymer or with a pigment dispersant, such as binder resins of the kind already described, in particular acrylic or polyurethane resins, according to known methods. In general, the pigment and dispersing resin, polymer, or dispersant are brought into contact under a shear high enough to break the pigment agglomerates down to the primary pigment particles and to wet the surface of the pigment particles with the dispersing resin, polymer, or dispersant. The breaking of the agglomerates and wetting of the primary pigment particles are important for pigment stability and color development. The pigmented bases may also include mica pigments, such as titanium dioxide-coated mica or mica coated with further metal oxides, which are generally stirred with a dispersing resin under low shear.

The mixer system bases can also contain additives which are conventional in paints. Examples of these are flow control agents, rheology-influencing agents, such as synthetic sodium lithium magnesium silicate hectorite clay, highly disperse silicic acid or polymer urea compounds, thickeners such as, carboxyl group-containing polyacrylate thickeners or associative thickeners based on polyurethane, microgels, defoaming agents, wetting agents, anti-cratering agents, dispersants, anti-settling agents, UV absorbers, hindered amine light stabilizers such as HALS compounds, benzotriazoles or oxalanilides, free-radical scavengers, defoamers, adhesion promoters, wax, and catalysts and curing accelerators. The additives are used in the conventional quantities known to the person skilled in the art.

A further component of the mixer system is a reducer base (sometimes simply called a reducer). The reducer base is used to bring the refinish paint to a desired viscosity for application. The reducer base may contain only deionized water, but preferably the reducer base contains at least one rheology-controlling additive or other additives and may contain one or more water-thinnable or water-dispersible binder resin or polymer and one or more organic solvent such as those already mentioned.

A preferred embodiment of the mixer system is one in which all the pigmented bases contain the same binder resins or polymers, particularly preferably in the same or about the same ratio of the amounts. It is particularly desirable that, independently of the refinish paint color and hence independently of the mixing ratio of the various pigmented bases, the resulting refinish paints will have the same or about the same binder system and achieve constant film properties.

A refinish paint is prepared by mixing at least one of the discrete portions of metal flake pigment and solid, water-soluble polymer with a mixing base. The resulting mixture is typically agitated for 5 to 10 minutes using a typical mixing rack used in the refinish market place or by hand. Such mixing equipment used in the automobile refinish market is described in U.S. Pat. Nos. 4,580,399 and 4,407,584 and are incorporated herein by reference. The aqueous, metallic refinish paint so produced is applied in refinishing an automotive vehicle or part.

Traditional methods for repairing damaged areas of a one-coat or multicoat finish comprise careful cleaning and rubbing, possibly puttying and filling of the damaged area. An aqueous refinish paint prepared from the automotive refinish coating mixer systems is applied to substrates pre-coated with conventional primers and/or fillers and/or further coating compositions. Examples of substrates here are metal and plastics substrates, in particular the substrates known in the automotive industry, such as, iron, zinc, aluminum, magnesium or the alloys thereof, and polyurethanes, polycarbonates or polyolefins. These substrates are precoated in the conventional manner. The primers and/or fillers can be conventional coating compounds of the type used as filler and/or primer by the person skilled in the art in vehicle painting. The aqueous refinish paint can, however, also be applied to intact old finishes (original or refinishing paints) or to primed new parts, for example, primed plastics parts. The damaged area is sprayed in such a way that the paint hides the damaged area and runs into the adjacent zones. When the aqueous refinish paint is a basecoat, after the basecoat prepared in this manner has dried at room temperature or under forced drying conditions (for example 10 min. at 60° C., 80° C. or IR drying), a suitable transparent topcoat coating composition is applied. The clear lacquers are preferably applied wet-on-wet to the water-based paint coat. Clearcoat coating compositions typically include no pigment, but may include small amount of colorants or fillers that do not unduly affect the transparency or desired clarity of the clearcoat coating layer produced from the composition.

In principle, any known non-pigmented or transparent pigmented coating compounds, as are conventional, for example, in vehicle painting, are suitable as clear lacquers. These can be clear solvent- or water-based as well as powder clearcoats. One- or two-component clearcoats are suitable. In particular, they are two-component clear lacquers based on chemically crosslinking binders, for example, based on hydroxy-functional binder components and polyisocyanate crosslinking agents. After an optionally required flash-off period of about 5 minutes, the basecoat is then dried together with the topcoat. If two-component clearcoats are used, drying is carried out in general at temperatures of below 100° C., preferably of below 80° C. for example, 40 to 60° C., within 30 to 80 minutes. Curing can also take place or be assisted by means of IR or NIR radiation. When using binders which can be cured by means of high-energy radiation, curing can also take place by means of UV radiation. The dry film thicknesses of the basecoat are in general between 5 and 25 µm, those of the topcoat in general between 30 and 70 µm.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An automotive refinish coating mixer system, comprising:
    (a) at least one pellet of a compressed mixture of a metal pigment and a powdered, water-soluble polymer, wherein the at least one pellet has a water-soluble coating layer, and the metal pigment having a surface treatment to resist degradation by water;
    (b) at least one aqueous pigmented or unpigmented base; and (c) optionally a reducer base;
wherein the powdered, water-soluble polymer has a mean particle size being in the range from 10 to 400 μm.

2. The automotive refinish coating mixer system according to claim 1 wherein the water-soluble coating layer comprises polyvinylpyrrolidone.

3. The automotive refinish coating mixer system according to claim 1, wherein the water-soluble polymer of the at least one pellet comprises polyvinylpyrrolidone.

4. The automotive refinish coating mixer system according to claim 1, wherein the metal pigment comprises an aluminum flake pigment.

5. The automotive refinish coating mixer system of claim 1 comprising: a plurality of aqueous pigmented and unpigmented bases and the reducer base.

6. The automotive refinish coating mixer system according to claim 3, wherein the polyvinylpyrrolidone has a weight average molecular weight of least about 10,000 and up to about 60,000.

* * * * *